(12) United States Patent
Blackburn et al.

(10) Patent No.: US 9,718,561 B2
(45) Date of Patent: Aug. 1, 2017

(54) FORWARD LOOKING TURRET

(71) Applicant: The Boeing Company, Chicago, IL (US)

(72) Inventors: John P. Blackburn, Albuquerque, NM (US); Ryan D. Sparks, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 14/502,358

(22) Filed: Sep. 30, 2014

(65) Prior Publication Data

US 2016/0090195 A1    Mar. 31, 2016

(51) Int. Cl.
*F16M 1/00*     (2006.01)
*F16M 3/00*     (2006.01)
(Continued)

(52) U.S. Cl.
CPC .......... *B64D 47/08* (2013.01); *F16M 13/022* (2013.01); *G01C 21/18* (2013.01); *G02B 7/00* (2013.01); *F16M 11/10* (2013.01); *F16M 11/123* (2013.01); *F16M 11/18* (2013.01); *F16M 11/2014* (2013.01); *F16M 11/2064* (2013.01); *F16M 13/02* (2013.01); *G01C 19/16* (2013.01); *G02B 27/644* (2013.01); *G08B 13/1963* (2013.01); *G08B 13/19619* (2013.01); *G08B 13/19632* (2013.01)

(58) Field of Classification Search
CPC ... B64D 47/08; F42B 15/01; G08B 13/19617; G08B 13/19619; G08B 13/1963; G08B 13/19632; G03B 15/006; G01C 21/18; G01C 19/16; F16M 11/2064; F16M 11/18; F16M 11/10; F16M 11/2014; F16M 13/02; F16M 11/123; F41G 3/22; G01S 7/4813; G01S 17/42; G02B 27/644
USPC ........ 396/7, 12, 427, 13, 428; 348/143, 144; 244/3.15, 3.16, 118.1, 129.1, 130; 248/184.1, 187.1, 274.1, 550, 660; 342/63
See application file for complete search history.

(56) References Cited

U.S. PATENT DOCUMENTS

| | | | |
|---|---|---|---|
| 4,636,044 A * | 1/1987 | Loy ........................ | B64D 47/08 359/401 |
| 5,806,789 A * | 9/1998 | Boulware .............. | B64D 47/08 244/1 R |

(Continued)

*Primary Examiner* — Jonathan Liu
*Assistant Examiner* — Taylor Morris
(74) *Attorney, Agent, or Firm* — Charles L. Moore; Moore & Van Allen PLLC

(57) ABSTRACT

A gimbal mechanism for a turret includes a support member and a pair of opposing yoke arms extending from the support member. The pair of opposing yoke arms define a first axis. A sphere is rotatably mounted between the opposing yoke arms for rotation about the first axis. A disk is rotatably mounted within the sphere for rotation about a second axis perpendicular to the first axis. The disk is sized for rotation within the sphere. The second axis may be offset from the first axis. An aperture is provided in the disk. The sphere includes a slot within which the aperture is moveable in response to rotation of the disk about the second axis. The aperture is movable to define a field of coverage in response to rotation of the sphere about the first axis and the disk about the second axis.

20 Claims, 7 Drawing Sheets

(51) Int. Cl.

| | | |
|---|---|---|
| *F16M 5/00* | (2006.01) | |
| *F16M 7/00* | (2006.01) | |
| *F16M 9/00* | (2006.01) | |
| *F16M 11/00* | (2006.01) | |
| *B64D 47/08* | (2006.01) | |
| *F16M 13/02* | (2006.01) | |
| *G02B 7/00* | (2006.01) | |
| *G01C 21/18* | (2006.01) | |
| *F16M 11/14* | (2006.01) | |
| *E04G 3/00* | (2006.01) | |
| *F16M 13/00* | (2006.01) | |
| *F42B 10/00* | (2006.01) | |
| *G03B 39/00* | (2006.01) | |
| *G03B 13/20* | (2006.01) | |
| *G02B 7/04* | (2006.01) | |
| *G03B 3/00* | (2006.01) | |
| *G03B 13/00* | (2006.01) | |
| *G03B 17/00* | (2006.01) | |
| *G01S 13/00* | (2006.01) | |
| *G08B 13/196* | (2006.01) | |
| *F16M 11/12* | (2006.01) | |
| *F16M 11/18* | (2006.01) | |
| *G02B 27/64* | (2006.01) | |
| *F16M 11/10* | (2006.01) | |
| *F16M 11/20* | (2006.01) | |
| *G01C 19/16* | (2006.01) | |

(56) References Cited

U.S. PATENT DOCUMENTS

| | | | |
|---|---|---|---|
| 6,129,307 A | 10/2000 | Deoms | |
| 6,268,882 B1* | 7/2001 | Elberbaum | G08B 13/19619 |
| | | | 348/143 |
| 6,527,238 B2* | 3/2003 | Shental | G02B 27/644 |
| | | | 248/276.1 |
| 7,032,469 B2* | 4/2006 | Bailey | G01D 5/34 |
| | | | 356/139.03 |
| 7,264,220 B2 | 9/2007 | Dent | |
| 7,307,771 B2 | 12/2007 | Foote | |
| 7,520,685 B2* | 4/2009 | Lee | G03B 17/02 |
| | | | 348/373 |
| 7,854,555 B2* | 12/2010 | Chapman | B66F 11/048 |
| | | | 396/428 |
| 7,905,463 B2 | 3/2011 | Burnham | |
| 8,527,115 B2 | 9/2013 | Greenfeld | |
| 8,635,938 B2 | 1/2014 | King | |
| 2002/0063197 A1 | 5/2002 | Voigt | |
| 2004/0218287 A1 | 11/2004 | Casteleiro | |
| 2005/0041965 A1* | 2/2005 | Morozumi | F16M 11/10 |
| | | | 396/427 |
| 2006/0017842 A1* | 1/2006 | Jun | G03B 37/02 |
| | | | 348/373 |
| 2010/0073664 A1* | 3/2010 | Krasutsky | G01S 7/4811 |
| | | | 356/4.01 |
| 2013/0048792 A1* | 2/2013 | Szarek | B64C 39/024 |
| | | | 244/175 |

* cited by examiner

FORWARD LOOKING TURRET

FIELD

The present disclosure relates to electro-optical systems, and more particularly to a forward looking turret for airborne applications and other applications.

BACKGROUND

FIG. 1 is an example of a prior art airborne optical turret configuration 100 extending from a fuselage 102 of an aircraft 104. The optical turret may be configured to transmit optical signals, receive optical signals or detect electromagnetic energy in the optical spectrum, or both transmit and receive optical signals and detect optical energy. In the exemplary configuration of FIG. 1, an outer, or 'azimuth' (AZ) axis of the turret 100 is represent by broken line 106 perpendicular to a direction of flight of the aircraft. FIG. 2 is an example of another prior art optical turret configuration 200 installed on a nose of a pod 202. In this implementation a singularity or "gimbal lock" condition results when a line of sight (LOS) 204 of an optical aperture 206 of the hosted optical system (not shown in FIG. 2) housed within an interior of the optical turret 200 is pointed in the direction of flight as illustrated by arrow 208. If the turret 200 is articulated about an inner, or 'elevation' (EL) axis 210 such that the line of sight (LOS) 204 is parallel to the azimuth or AZ axis 212, there exists an infinite number of AZ axis 212 positions of the turret 200 that result in the same LOS 204 orientation. The result is a mathematical singularity in the derivation of the servo control laws. As the LOS 204 approaches the singularity position, corresponding to the AZ axis 212, the gimbal control servos (not shown in FIG. 2) housed within the turret 200 which control movement of the LOS 204 begin to exhibit instability. This singularity may be avoided by orientation of the AZ axis 212 perpendicular to the aircraft flight direction 208 similar to the turret configuration 100 in FIG. 1. However, packaging of this axis orientation in the nose of an aircraft pod, such as pod 200, severely limits the achievable aperture size, as a percentage of the host pod diameter, which restricts the collection area for detection of optical or light energy and imaging.

SUMMARY

In accordance with an embodiment, a forward looking turret may include a gimbal mechanism that allows near-hemispherical, forward-looking field coverage from a nose of a pod or fuselage of an aircraft, with no gimbal lock singularities in a field of regard.

In accordance with an embodiment, a gimbal mechanism for a turret may include a support member and a pair of opposing yoke arms extending from the support member. The pair of opposing yoke arms define a first axis. The gimbal mechanism may also include a sphere rotatably mounted between the opposing yoke arms for rotation about the first axis. The gimbal mechanism may additionally include a disk rotatably mounted within the sphere for rotation about a second axis perpendicular to the first axis. The disk includes a diameter slightly smaller than the sphere that permits rotation of the disk within the sphere. The second axis may be offset from the first axis. The gimbal mechanism may further include an aperture provided in the disk. The sphere may include a slot within which the aperture is moveable between the pair of opposing yoke arms in response to rotation of the disk about the second axis. The aperture is movable to define a field of coverage in response to rotation of the sphere about the first axis and the disk about the second axis.

In accordance with another embodiment, a forward looking turret may include a pod and a pair of opposing yoke arms extending from the pod. The pair of opposing yoke arms may define a first axis. The forward looking turret may also include a sphere rotatably mounted between the opposing yoke arms for rotation about the first axis. The sphere may extend partially from an open circular end of the pod. The sphere and open circular end of the pod may be configured to substantially prevent drag and allow rotation of the sphere within the pod. The forward looking turret may additionally include a bulkhead disposed behind the sphere within the pod. The forward looking turret may additionally include a drive mechanism mounted to the bulkhead that rotates the sphere about the first axis. The forward looking turret may further include a disk rotatably mounted within the sphere for rotation about a second axis perpendicular to the first axis. The disk may include a diameter slightly smaller than the sphere that permits rotation of the disk within the sphere. The second axis may be offset from the first axis. The forward looking turret may also include an aperture provided in the disk and the sphere may include a slot within which the aperture is moveable between the pair of opposing yoke arms in response to rotation of the disk about the second axis. The aperture is movable to define a field of coverage in response to rotation of the sphere about the first axis and the disk about the second axis.

In accordance with a further embodiment, a method for providing a forward looking turret may include providing a pod having a pair of opposing yoke arms extending from the pod. The pair of opposing yoke arms may define a first axis. The method may also include rotatably mounting a sphere between the opposing yoke arms for rotation about the first axis. The sphere may extend partially from an open circular end of the pod. The sphere and open circular end of the pod may be configured to substantially prevent drag and allow rotation of the sphere within the pod. The method may additionally include providing a bulkhead disposed behind the sphere within the pod and providing a drive mechanism mounted to the bulkhead. The drive mechanism may be configured to rotate the sphere about the first axis. The method may also include rotatably mounting a disk within the sphere for rotation about a second axis perpendicular to the first axis. The disk may have a diameter slightly smaller than the sphere that permits rotation of the disk within the sphere. The second axis may be offset from the first axis. The method may further include providing an aperture in the disk and the sphere may include a slot within which the aperture may be moveable between the pair of opposing yoke arms in response to rotation of the disk about the second axis. The aperture may be movable to define a field of coverage in response to rotation of the sphere about the first axis and the disk about the second axis.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
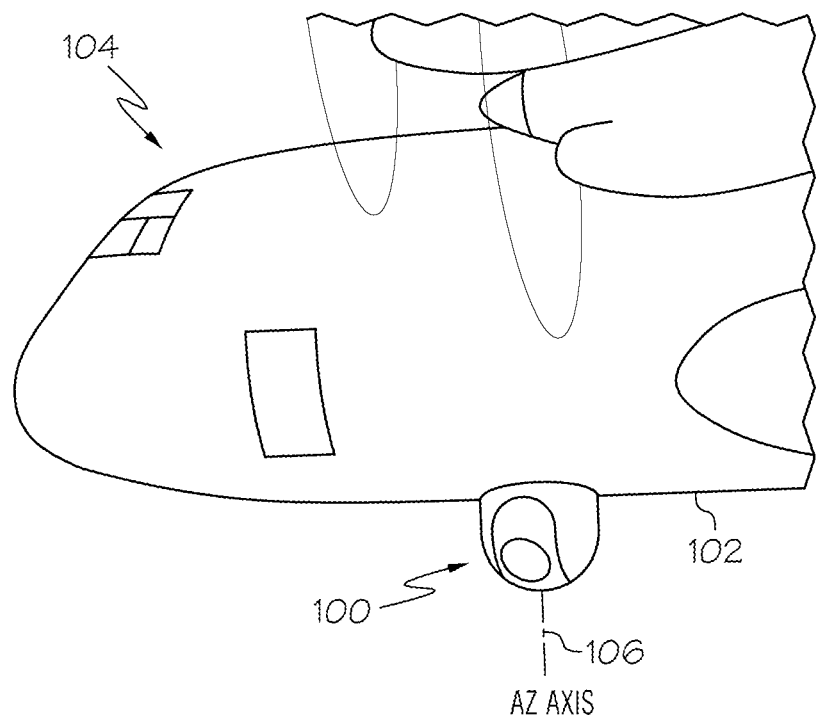
FIG. 1 is an example of a prior art airborne optical turret configuration extending from a fuselage of an aircraft.
Figure 2:
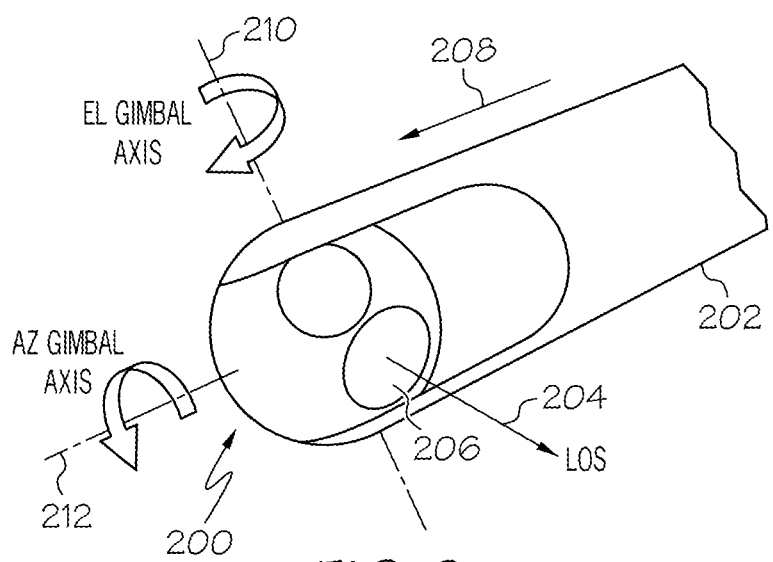
FIG. 2 is an example of another prior art optical turret configuration installed on a nose of a pod that is mountable to an aircraft.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 3:
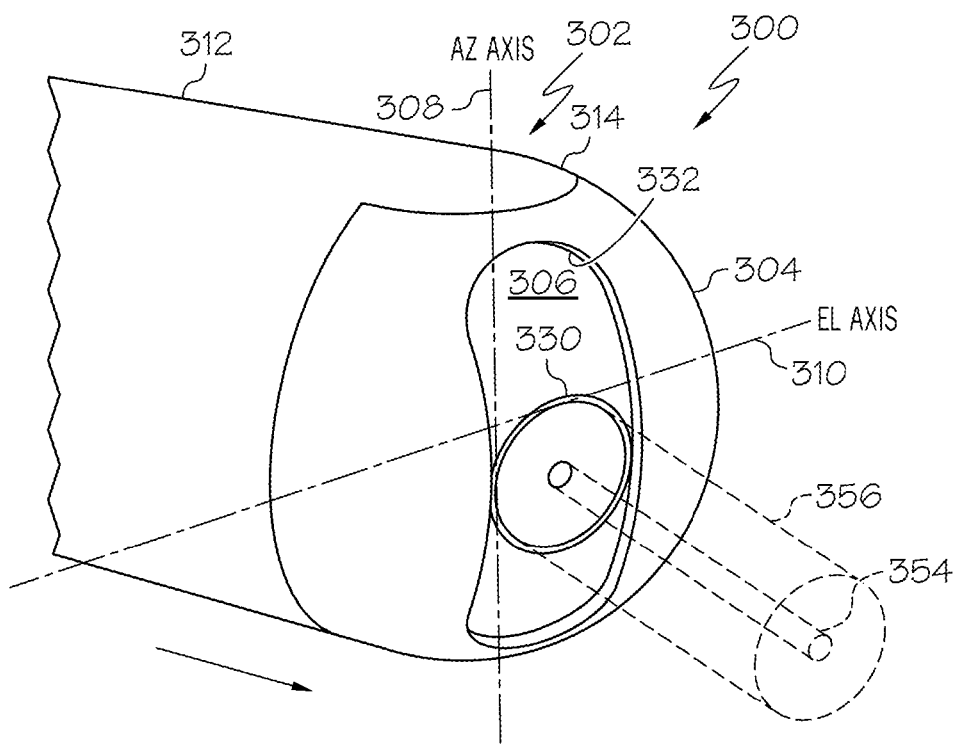
FIG. 3 is a perspective view of an exemplary forward looking turret in accordance with an embodiment of the present disclosure.
Figure 5:
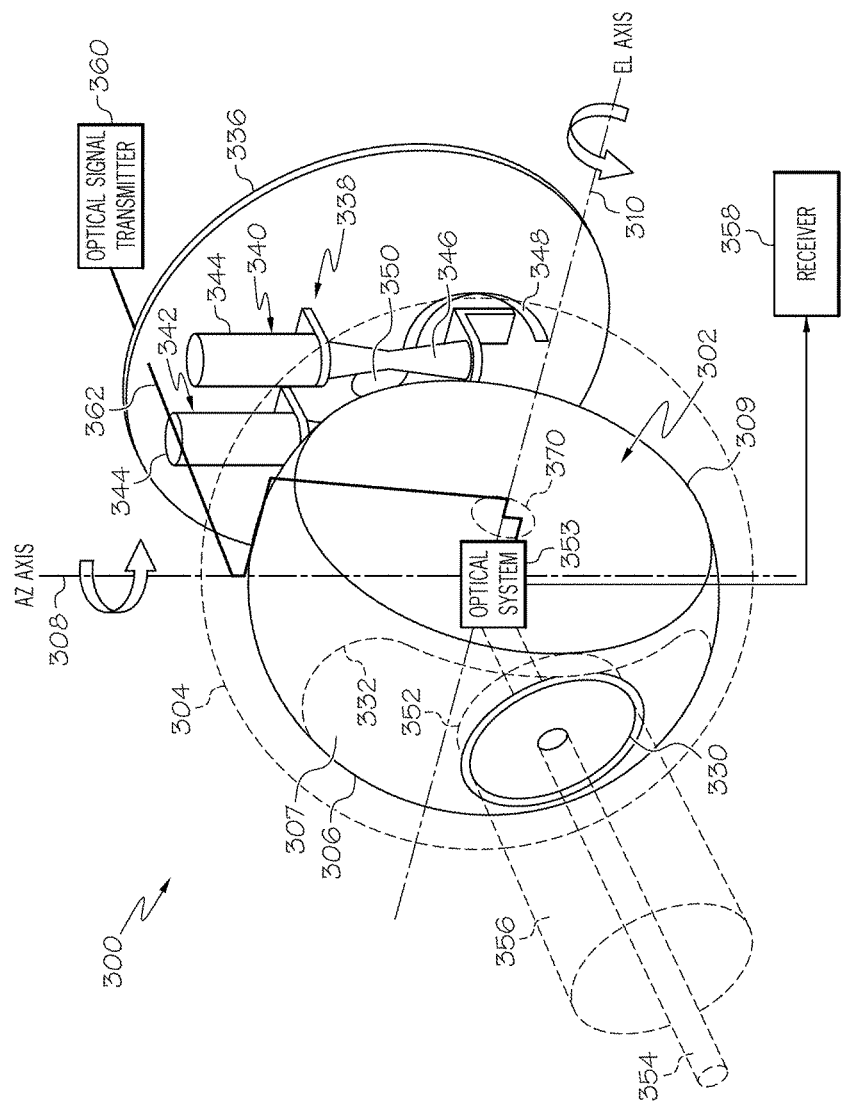
FIG. 5 is a perspective view of the exemplary forward looking turret of FIG. 3 with the support member removed and the azimuth sphere represented by a broken line.

FIG. 3 is a perspective view of an exemplary forward looking turret 300 in accordance with an embodiment of the present disclosure. The forward looking turret 300 may include a gimbal mechanism 302 that includes a sphere 304 and a disk 306. The sphere 304 may also be referred to as an azimuth sphere and the disk 306 may also be referred to as an elevation disk. As illustrated and described with reference to FIG. 5, the elevation disk 306 may be a truncated sphere with a semispherical portion on opposite sides removed. Accordingly, the elevation disk 306 may have a curved circumferential surface 307 defined by the truncated sphere disposed between two flat sides 309. As described in more detail herein, the azimuth sphere 304 may be rotatably mounted for rotation about a first axis or an azimuth (AZ) axis 308 and the elevation disk 306 may be rotatably mounted within the sphere 304 for rotation about a second axis or elevation (EL) axis 310. The elevation disk 306 has a diameter that is slightly smaller or just smaller than a diameter of the azimuth sphere to permit rotation of the disk 306 within the sphere 304. The geometric center of the elevation disk 306 (which also corresponding to the second or EL axis 310) is offset from the geometric center of the azimuth sphere 304 (which also corresponds to the first or AZ axis 308). The offset between the AZ and EL rotation axes 308 and 310 is best shown in FIG. 5. Because of the offset between axes of rotation 308 and 310 and the difference in diameters of the elevation disk 306 and the azimuth sphere 304, the elevation disk 306 does not penetrate the back of the sphere 304.

Figure 4:
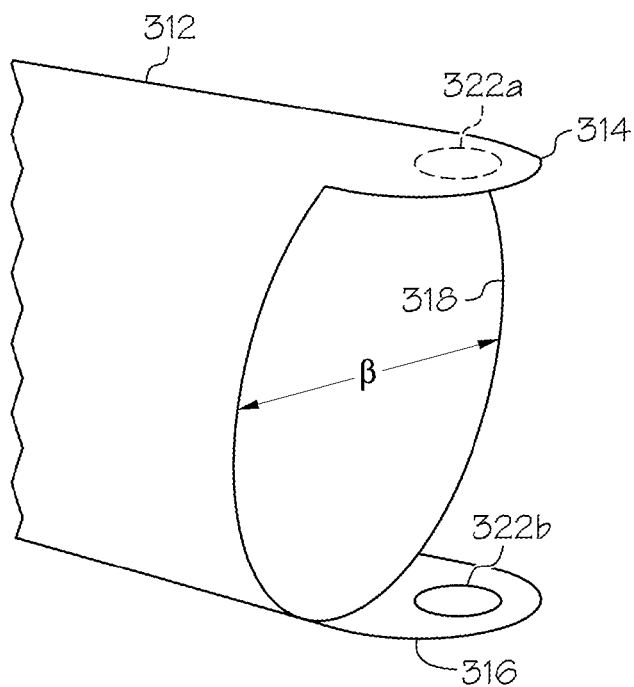
FIG. 4 is a perspective partial view of the support member of the exemplary forward looking turret of FIG. 3.

Referring back to FIG. 3, the forward looking turret 300 and gimbal mechanism 302 may include a support member 312. The support member 312 may be a pod that is mountable to an aircraft. The support member 312 or pod may be cylindrical or tube shaped as illustrated in FIGS. 3 and 4, although other shapes may be used in some applications. Referring also to FIG. 4, FIG. 4 is a perspective partial view of the support member 312 or pod of the exemplary forward looking turret 300 of FIG. 3. A pair of opposing yoke arms 314 and 316 may extend from the support member 312. The pair of opposing yoke arms 314 and 316 may define the first axis or AZ axis 308 shown in FIG. 3. The azimuth sphere 304 is rotatably mounted between the opposing yoke arms 314 and 316 for rotation about the first axis or AZ axis 308 as best shown in FIG. 3. The azimuth sphere 304 may be mounted by the opposing yoke arms 314 and 316 with the sphere 304 extending partially from an open circular end 318 (FIG. 4) of the support member 312 or pod. The azimuth sphere 304 and open circular end 318 of the support member 312 may be configured to substantially prevent drag while allowing rotation of the azimuth sphere 304 within the support member 312 or pod when the support member 312 or pod is mounted on an aircraft or other vehicle.

Figure 6:
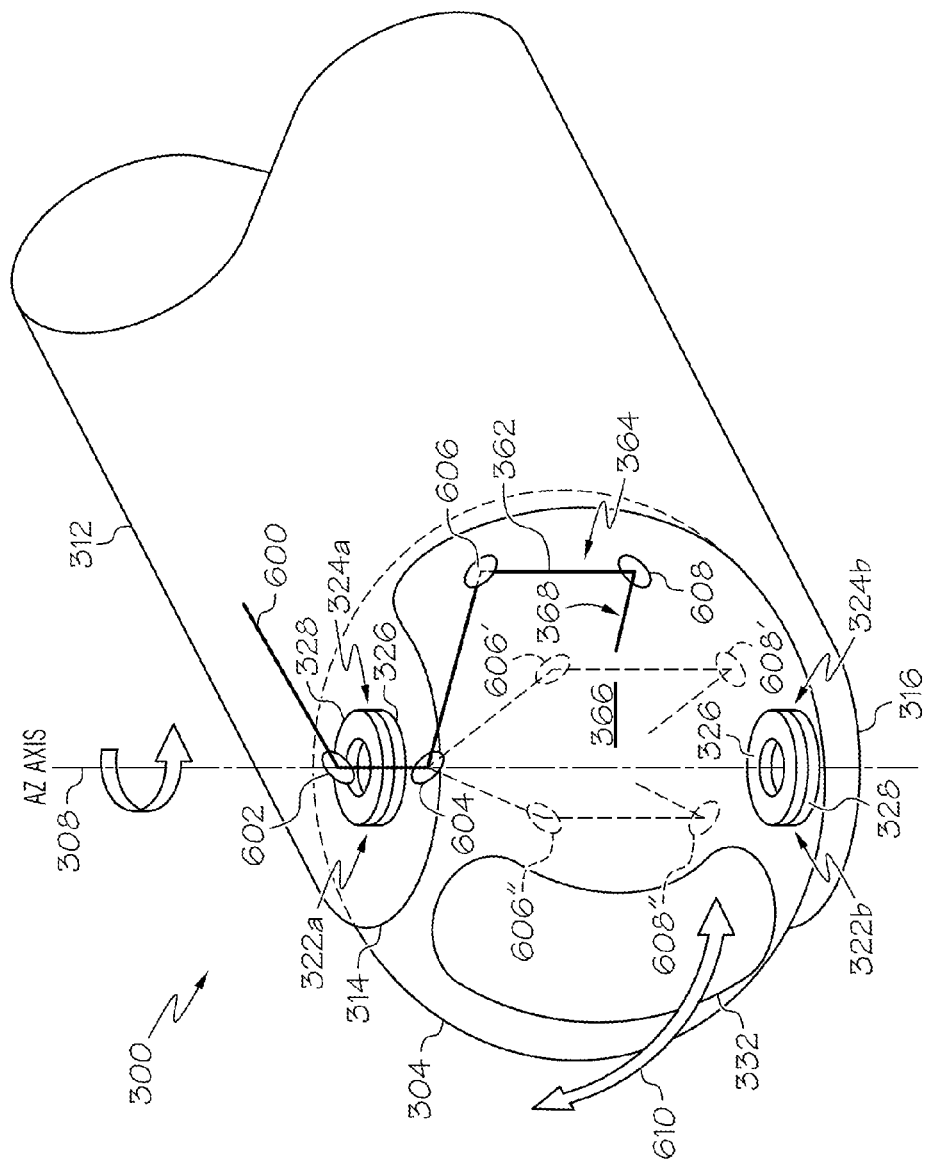
FIG. 6 is a perspective view of the exemplary forward looking turret of FIG. 3 illustrating a first portion of the coudé path within an interior of the azimuth sphere.

As shown in FIG. 4, a bearing interface 322a and 322b may be associated with each yoke arm 314 and 316 that rotatably couples or connects the azimuth sphere 304 to each opposing yoke arm 314 and 316 for rotation of the azimuth sphere 304 about the first axis or AZ axis. The bearing interfaces 322a and 322b may be any arrangement that permits rotation of the azimuth sphere 304 about the first or AZ axis 308. Referring also to FIG. 6, in an exemplary embodiment, each bearing interface 322a and 322b may include a roller bearing pair 324a and 324b. A first or upper roller bearing pair 324a may be associated with the yoke arm 314 or upper yoke arm and a second or lower roller bearing pair 324b may be associated with the yoke arm 316 or lower yoke arm. A first bearing assembly 326 of each roller bearing pair 324a and 324b may be attached to the azimuth sphere 304 and a second bearing assembly 328 of each roller bearing pair 324a and 324b may be attached to the respective yoke arms 314 and 316. The first bearing assembly 326 and the second bearing assembly 328 interface with one another when the azimuth sphere 304 is rotatably mounted by the bearing interfaces 324a and 324b between the yoke arms 314 and 316 for rotation about the first axis or AZ axis 308. Contrary to prior art turrets having an orientation of the AZ axis 212 perpendicular to the aircraft flight direction 208, the present forward looking turret 300 does not severely limit the achievable aperture size. Larger apertures are desirable for electro-optical systems to maximize the collection area for detection of optical or light energy and imaging and to minimize diffraction of transmitted light.

Referring back to FIG. 3, the elevation disk 306 is rotatably mounted within the azimuth sphere 304 for rotation about the second axis or EL axis 310. The elevation disk 306 includes a diameter slightly smaller than the sphere 304 that permits rotation of the disk 306 within the sphere 304. The second axis or EL axis 310 is offset from the first or AZ axis 308.

Figure 8A:
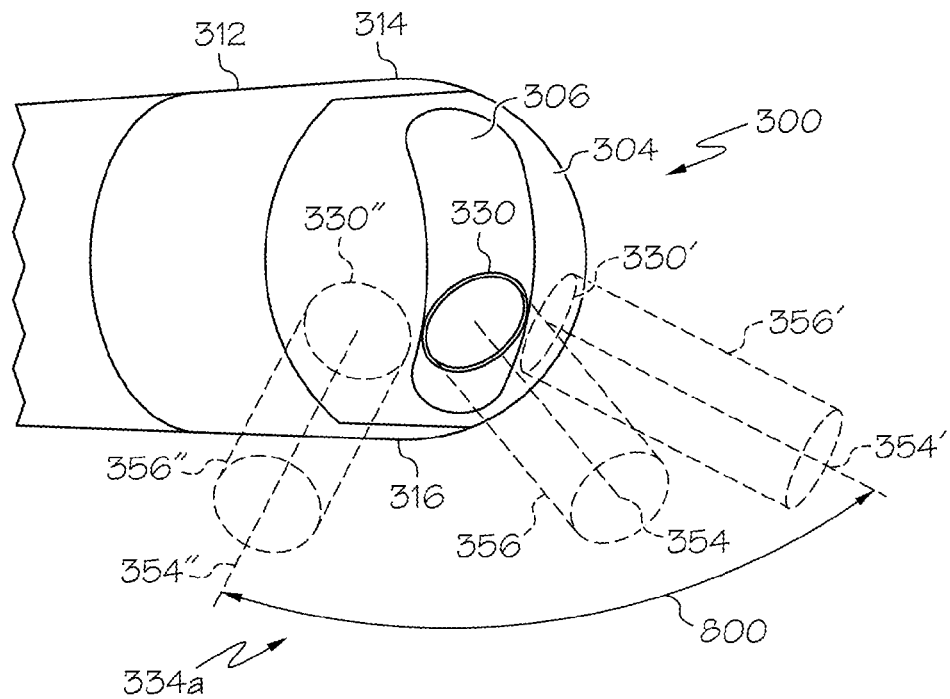
FIGS. 8A and 8B are perspective views of the forward looking turret of FIG. 3 illustrating azimuth and elevation field coverage of the aperture of the forward looking turret.
Figure 8B:
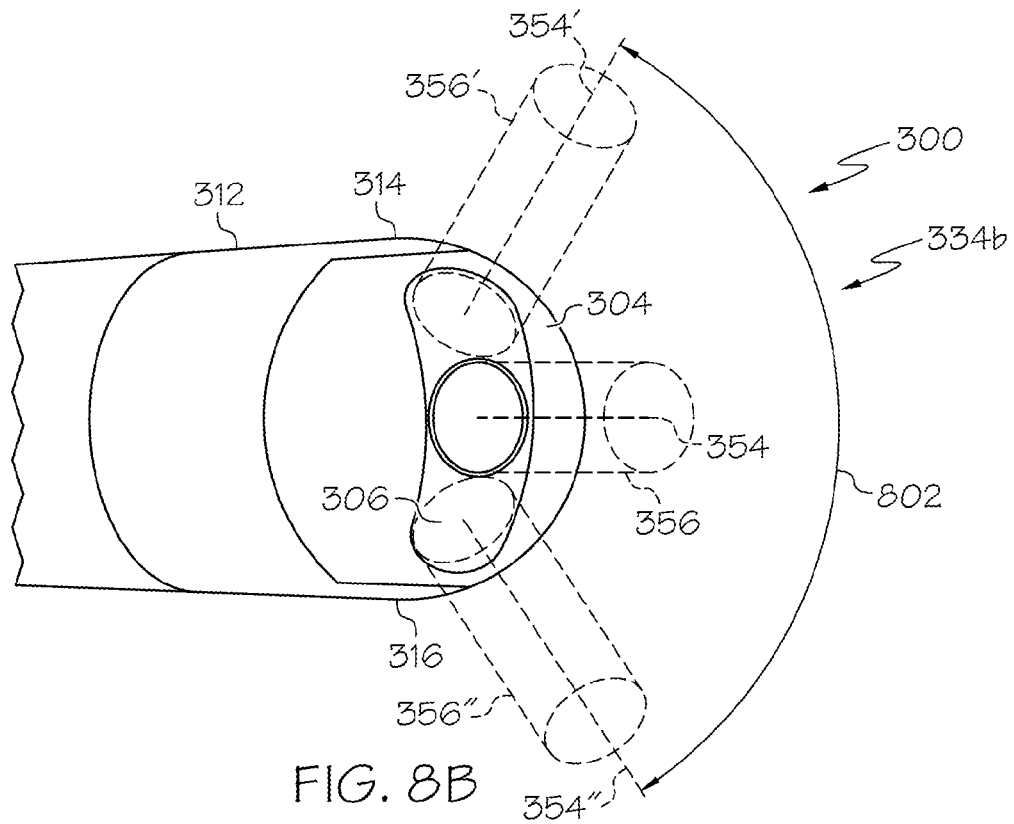

An aperture 330 or optical window is provided in the elevation disk 306 and the azimuth sphere 304 includes a slot 332 within which the aperture 330 is movable between the pair of opposing yoke arms 314 and 316 in response to rotation of the disk 306 about the second or EL axis 310. The aperture 330 may be moved to define a field of coverage 334 (334a and 334b), as illustrated in FIGS. 8A and 8B, in response to rotation of the azimuth sphere 304 about the first axis or AZ axis 308 and the elevation disk 306 about the second axis or EL axis 310.

As a consequence of the elevation disk 306 having a diameter just smaller than the azimuth sphere 304, gaps may occur at the extremes of the elevation travel of the aperture 330. The gaps may be 'closed out' by feathering of the azimuth sphere 304 into the elevation disk 306. While this geometry may not support transonic operations, the feathered facets result in manageable aero-mechanical torques at subsonic speeds. In other application the azimuth sphere 304 and elevation disk 306 may be modified for transonic operations.

Referring also to FIG. 5, FIG. 5 is a perspective view of the exemplary forward looking turret 300 of FIG. 3 with the support member 312 or pod removed and the sphere 304 represented by a broken line. FIG. 5 shows the elevation disk 306 that is rotatably mounted within the azimuth sphere 304. As previously discussed, the elevation disk 304 may be a truncated sphere with semispherical portions on opposite sides removed. The gimbal mechanism 302 of the forward looking turret 300 may include a bulkhead 336. The bulkhead 336 may be disposed behind the sphere 304 within the support member 312 or pod. A drive mechanism 338 or assembly may be mounted to the bulkhead 336. The drive mechanism 338 may be configured to rotate the azimuth sphere 304 about the first or AZ axis 308.

The drive mechanism 338 may include dual opposing drive assemblies 340 and 342 that contact the sphere 304 and rotate the sphere 304 about the first axis 308 or AZ axis. The dual opposing drive assemblies 340 and 342 may work against one another to prevent backlash. Rotation of the azimuth sphere 304 in one direction or in an opposite direction may be performed by generating different opposing torques in the respective drive assemblies 340 and 342 so that the torque in one drive overcomes the torque in the other drive to rotate the azimuth sphere 304 in the desired direction of rotation. Each opposing drive assembly 340 and 342 may be an opposing gear or friction drive configured to act on or contact a back surface of the azimuth sphere 304 for rotation of the azimuth sphere 304. In accordance with an embodiment, each opposing drive assembly 340 and 342 may include an electric motor 344 or servo motor that is mechanically coupled to a roller 346 for rotation of the roller 346. The roller 346 is configured to contact the azimuth sphere 304 for rotation if the azimuth sphere 304 about the first axis 308 or AZ axis as described herein.

As shown in the exemplary embodiment of FIG. 5, placement of the sphere drive mechanism 338 or azimuth drives behind the azimuth sphere 304 removes the motor and sensor elements from the yoke arms 314 and 316. This allows the yoke arms 314 and 316 to have a substantially shorter profile than yoke arms that include a motor drive mechanism and sensor elements. This maximizes the ratio of aperture size to the turret diameter.

The forward looking turret 300 may also include an encoder scale 348 provided on the sphere 304. The encoder scale 348 may be etched on the azimuth sphere 304 or attached to the azimuth sphere 304 by any suitable arrangement. An encoder reader 350 may be mounted to the bulkhead 336 to read the encoder scale 348 as the azimuth sphere 304 is rotated and detect a position of the aperture 330 about the first axis 308 or AZ axis. The encoder reader 350 may be mounted between the respective rollers 346 of the dual opposing drive assemblies 340 and 342.

The elevation disk 306 may include an optical element 352 (shown in phantom in FIG. 5) or elements housed within the elevation disk 306 that may be part of an optical system 353. The optical system 353 (shown in phantom in FIG. 5) may be of various configurations and include elements or components that may be mounted in the elevation disk 306 and the azimuth sphere 304. For example, cameras and insertion optics (not shown in FIG. 5 for purposes of clarity) or other components may be provided in the sphere 304. The optical element 352 and the optical system 353 may be configured for transmitting an optical beam 354 or optical signals and receiving an optical beam 356 or incoming optical signals via the aperture 330. The optical system 353 may be configured so that the transmitted optical beam 354 may be at a center of incoming optical beam 356 as shown in the exemplary embodiment of FIG. 5. Other optical configurations for transmitting and receiving optical beams or signals may also be used with the forward looking turret 300 and gimbal mechanism 302 where the transmitted optical beam 354 may be at a different position relative to the incoming optical beam 356.

The optical system 353 may be electrically or optically coupled to a receiver 358 for receiving and processing signals received by the optical system 353. An optical signal transmitter 360 may be optically coupled to the optical system 353 for transmitting the optical beam 354 via the aperture 330 or optical window. The optical signal transmitter 360 may be an off-gimbal laser device or other optical transmitting device. The optical transmitter 360 may be optically coupled to the optical system 353 by a coudé optical path 362. The coudé optical path 362 is a free-space optical path in which a light beam or laser light beam is reflected by mirrors.

Referring also to FIG. 6, FIG. 6 is a perspective view of the exemplary forward looking turret 300 of FIG. 3 illustrating a first portion 364 of the coudé optical path 362 within an interior 366 of the azimuth sphere 304. The elevation disk 306 is not shown in FIG. 6 for purposes of clarity in describing the coudé optical path 362 within the interior 366 of the sphere 304. A light beam 600 or laser beam from an off-gimbal laser device (not shown in FIG. 6) or other optical signal source, such as optical signal transmitter 360 (FIG. 5) may be directed through the upper roller bearing pair 324*a* by a first mirror 602 of the coudé optical path 362. The first mirror 602 is rigidly attached to the upper yoke arm 314 of the support member 312 or pod. The roller bearing pairs 324*a* and 324*b* in the upper and lower yoke arms 314 and 316 allow low-friction, relative rotation between the azimuth sphere 304 and the yoke arms 314 and 316. The roller bearing pair 324*a* may be toroid shaped with an opening in the center for passage of the light beam 600. The lower roller bearing pair 324*b* may also be toroid shaped. The first mirror 602 reflects the light beam 600 through the center opening of the upper roller bearing pair 324*a* to a second mirror 604 and the second mirror 604 reflects the light beam 600 to a third mirror 606. The third mirror 606 reflects the light beam to a fourth mirror 608. The second, third and fourth mirrors 604, 606 and 608 are all rigidly attached to the interior 366 of the sphere 304. Accordingly, the mirrors 604, 606 and 608 will rotate in alignment with one another as the azimuth sphere 304 rotates about the first or AZ axis 308 as shown by the mirrors 606', 608' shown in phantom at a first rotation position of the azimuth sphere 304 and mirrors 606" and 608" shown in phantom at a second rotation position of the azimuth sphere 304. The second mirror 604 rotates or pivots with rotation of the azimuth sphere 304 and maintains alignment for reflecting light to the third mirror 606 because the first mirror 602 and the second mirror 604 are both centered on the axis of rotation of the sphere 304 which corresponds to the first or AZ axis 308. Rotation of the azimuth sphere 304 about the first axis or AZ axis 308 either clockwise or counterclockwise is illustrated by double ended arrow 610.

Figure 7:
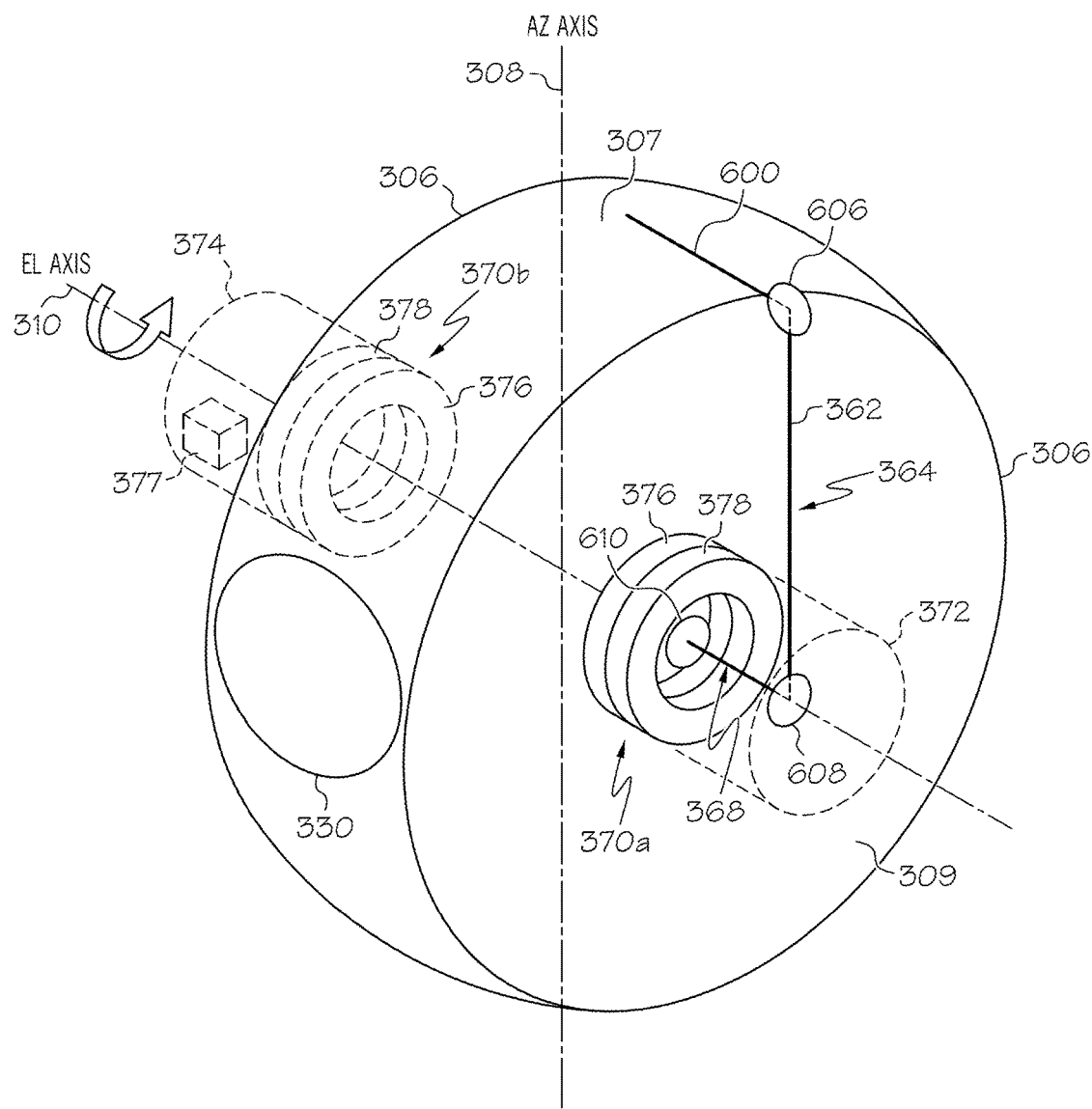
FIG. 7 is a perspective view of the elevation disk of the forward looking turret of FIG. 3 illustrating the first portion of the coudé optical path through the azimuth sphere and a second portion of the coudé optical path entering the elevation disk.

FIG. 7 is a perspective view of the elevation disk 306 of the forward looking turret 300 of FIG. 3 illustrating the first portion 364 of the coudé optical path 362 through the azimuth sphere 304 and a second portion 368 of the coudé optical path 362 entering the elevation disk 306. The azimuth sphere 304 and support member 312 or pod are not shown in FIG. 7 for purposes of clarity in further describing the coudé optical path 362. The second portion 368 of the coudé optical path 362 is aligned with the second axis or EL axis 310. The fourth mirror 608 reflects the light beam 600 to a fifth mirror 610. The fifth mirror 610 may be rigidly mounted within the elevation disk 306 on the axis of rotation of the elevation disk 306 which corresponds to the second axis or EL axis 310. The fifth mirror 610 rotates with the elevation disk 306 about the second or EL axis 310 but remaining on the axis of rotation of the elevation disk 306. The fifth mirror 610 may reflect the light beam 600 to the optical system 353 (FIG. 5) and the optical system 353 transmits the beam 600 (354 in FIG. 5) through the aperture 330.

A roller bearing arrangement 370a and 370b may be disposed on opposite flat sides 309 of the elevation disk 306 to rotatably couple the elevation disk 306 to respective interior bulkheads 372 and 374 (shown in phantom in FIG. 7 for purposes of clarity) of the azimuth sphere 304. Each roller bearing arrangement 370a and 370b may include a pair of roller bearing assemblies. Each pair of roller bearing assemblies may include a toroid shape with an opening for the coudé optical path 362. A first roller bearing assembly 376 of each pair may be attached to a side of the elevation disk 310 and a second roller bearing assembly 378 of each pair may be respectively attached to the bulkheads 372 and 374 of the azimuth sphere 304. As previously described, the fifth mirror 610 is rigidly attached to the elevation disk 306 and rotates with the disk 306 about the second or EL axis 310. Consequently, the light beam 600 reflected by the fifth mirror 610 will rotate with the elevation disk 306. The light beam 600 reflected by the fifth mirror 610 may be directed by the optical system 353 or optical element 352 of the optical system 353 (FIG. 5) within the disk 306 for transmission through the aperture 330 or optical window.

An electrical motor 377 may be mechanically coupled to at least one of the roller bearing arrangements 370a and 370b for rotating the elevation disk 306 about the second axis 310 or EL axis. The electric motor may be a frameless direct current (DC) torque motor.

FIGS. 8A and 8B are perspective views of the forward looking turret 300 of FIG. 3 illustrating azimuth and elevation field coverage. FIG. 8A illustrates azimuth articulation of the aperture 330 as represented by the double arrow 800. The azimuth articulation 800 defines the azimuth field of view 334a. FIG. 8B illustrated the elevation articular of the aperture 330 between the yoke arms 314 and 316 as represented by double arrow 802. The elevation articulation 802 defines the elevation field of view 334b. The field of view 334 of the forward looking turret 300 is defined by the combined azimuth and elevation field of views 334a and 334b.

The forward looking turret 300 described herein may be used for an airborne optical turret that provides a large-angle, forward looking field of coverage from the nose of a wing or a fuselage-mounted pod while exhibiting no gimbal lock singularities within the field of regard (FOR) and while maximizing the ratio of the optical aperture size to the host pod diameter. The forward looking turret 300 provides articulation of the optical (incoming and outgoing light) line of sight (LOS) about two orthogonal axes. As previously described, the rotation axes may be designated the azimuth (AZ) axis 308 and the elevation (EL) axis 310 as shown in FIG. 3. The limits of angular travel about the AZ and EL axes 308 and 310 (FOR) depend on the ratio of the optical aperture size to the pod diameter, β (FIG. 4), or, $$\beta = \frac{\phi_A}{\phi_P},$$

where $\phi_A$ is the aperture diameter, and $\phi_P$ is the pod diameter

As an example, given a 20 centimeter aperture, and a 50 centimeter turret diameter, β=0.4. For this value of β the FOR is approximately AZ=±60 degrees, and EL=±30 degrees. Smaller values of β provide a larger FOR, so aperture size and field coverage are traded design parameters for a fixed pod diameter. Accordingly, the maximum angular range of motion of the turret 300 depends on the ratio of the aperture size to the diameter of the pod β.

Figure 9:
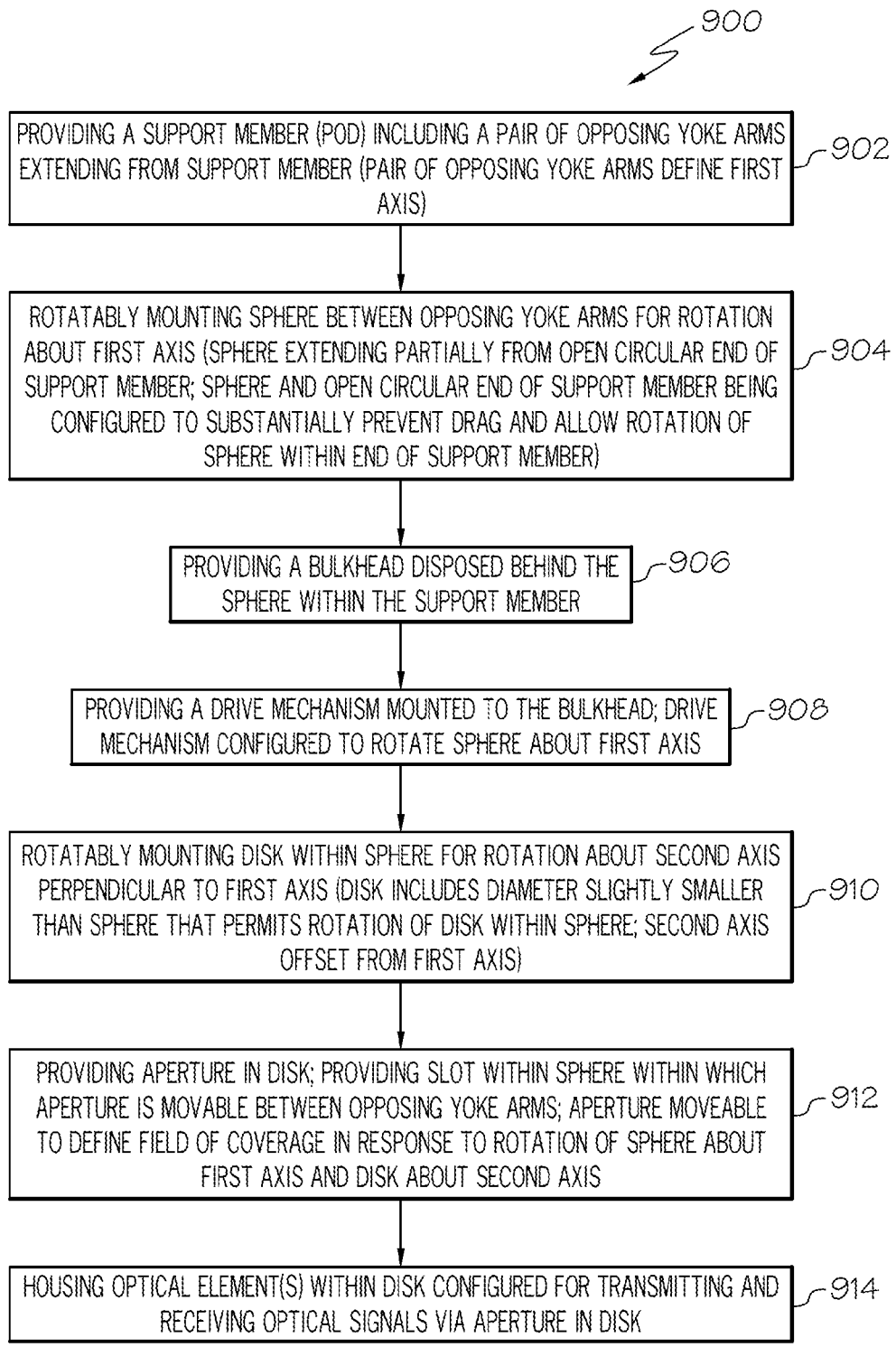
FIG. 9 is an example of a method for providing a forward looking turret in accordance with an embodiment of the present disclosure.

FIG. 9 is an example of a method 900 for providing a forward looking turret in accordance with an embodiment of the present disclosure. In block 902, a support member may be provided including a pair of opposing yoke arms extending from the support member. The pair of opposing yoke arms may define a first axis. The support member may be a pod that is mountable to an aircraft.

In block 904, a sphere or azimuth sphere may be rotatably mounted between the opposing yoke arms for rotation about the first axis. The sphere may extend partially from an open circular end of the support member or pod. The sphere and open circular end of the support member may be configured to substantially prevent drag and allow rotation of the sphere within the open end of the support member when the forward looking turret is mounted or attached to an aircraft or other vehicle.

In block 906, a bulkhead may be disposed behind the sphere and within the support member.

In block 910, a disk may be rotatably mounted within the sphere for rotation about a second axis that may be perpendicular to the first axis. The disk may include a diameter slightly smaller than the sphere that permits rotation of the disk within the sphere. The second axis is offset from the first axis.

In block 912, an aperture is provided in the disk and a slot is provided within the sphere within which aperture is movable between the opposing yoke arms. The aperture is movable to define a field of coverage in response to rotation of the sphere about the first axis and rotation of the disk about the second axis.

In block 914, an optical element or optical elements may be housed within the disk. The optical element or elements may form part of an optical system. The optical system may be configured for transmitting and receiving optical signals via the aperture in the disk.

The flowchart and block diagrams in the Figures illustrate the architecture, functionality, and operation of possible implementations of systems and methods according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiment or embodiments herein has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiment was chosen and described in order to best explain the principles of the embodiments and the practical application, and to enable others of ordinary skill in the art to understand the various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations of the present embodiments. The following claims are in no way intended to limit the scope of embodiments to those specific described herein.

What is claimed is:

1. A gimbal mechanism for a turret, comprising:
a support member;
a pair of opposing yoke arms extending from the support member, the pair of opposing yoke arms defining a first axis;
a sphere rotatably mounted between the opposing yoke arms for rotation about the first axis;
a disk rotatably mounted within the sphere for rotation about a second axis perpendicular to the first axis, the disk including a diameter slightly smaller than the sphere that permits rotation of the disk within the sphere, wherein the second axis is offset from the first axis;
an aperture provided in the disk, wherein the sphere comprises a slot within which the aperture is moveable between a position proximate each of the pair of opposing yoke arms in response to rotation of the disk about the second axis, the aperture being movable to define a field of coverage in response to rotation of the sphere about the first axis and the disk about the second axis;
an optical system, wherein the disk comprises at least an element of the optical system housed within the disk, the optical system being configured for transmitting and receiving optical signals via the aperture; and
an optical path for transmitting optical signals from an optical signal transmitter to the optical system.

2. The gimbal mechanism of claim 1, wherein the support member comprises a pod mountable to an aircraft, wherein the sphere is mounted by the opposing yoke arms extending partially from an open circular end of the pod, the sphere and open circular end of the pod being configured to substantially prevent drag and allow rotation of the sphere within the pod.

3. The gimbal mechanism of claim 1, further comprising a bearing interface associated with each yoke arm that rotatably connects the sphere to each opposing yoke arm for rotation of the sphere about the first axis.

4. The gimbal mechanism of claim 3, further comprising:
a bulkhead disposed behind the sphere within an open end of the support member between the pair of opposing yoke arms; and
a drive mechanism mounted to the bulkhead that rotates the sphere about the first axis.

5. The gimbal mechanism of claim 4, wherein the drive mechanism comprises dual opposing drive assemblies that contact the sphere and rotate the sphere about the first axis, the dual opposing drive assemblies work against one another to prevent backlash, rotation of the sphere in one direction or in an opposite direction is caused by generating a different torque in each dual opposing drive assembly so that the torque in one dual opposing drive assembly overcomes the torque in the other dual opposing drive assembly to rotate the sphere.

6. The gimbal mechanism of claim 4, further comprising:
an encoder scale provided on the sphere; and
an encoder reader mounted on the bulkhead to read the encoder scale and detect a position of the aperture about the first axis.

7. The gimbal mechanism of claim 1, wherein the optical path comprises a coudé optical path for transmitting the optical signals from the optical signal transmitter to the optical system.

8. The gimbal mechanism of claim 7, further comprising a roller bearing on each side of the disk to rotatably couple the disk to an interior bulkhead of the sphere, wherein each roller bearing comprises a toroid shape with an opening for the coudé optical path.

9. The gimbal mechanism of claim 8, wherein the disk comprises a truncated sphere with a semi spherical portion on opposite sides removed.

10. The gimbal mechanism of claim 9, further comprising an electrical drive motor associated with at least one of the roller bearings for rotating the disk about the second axis.

11. A forward looking turret, comprising:
a pod;
a pair of opposing yoke arms extending from the pod, the pair of opposing yoke arms defining a first axis;
a sphere rotatably mounted between the opposing yoke arms for rotation about the first axis, the sphere extending partially from an open circular end of the pod, the sphere and open circular end of the pod being configured to substantially prevent drag and allow rotation of the sphere within the pod;
a bulkhead disposed behind the sphere within the pod;

a drive mechanism mounted to the bulkhead that rotates the sphere about the first axis;

a disk rotatably mounted within the sphere for rotation about a second axis perpendicular to the first axis, the disk including a diameter slightly smaller than the sphere that permits rotation of the disk within the sphere, wherein the second axis is offset from the first axis;

an aperture provided in the disk, wherein the sphere comprises a slot within which the aperture is moveable between a position proximate each of the pair of opposing yoke arms in response to rotation of the disk about the second axis, the aperture being movable to define a field of coverage in response to rotation of the sphere about the first axis and the disk about the second axis;

an optical system, wherein the disk comprises at least an element of the optical system housed within the disk, the optical system being configured for transmitting and receiving optical signals via the aperture; and an optical path for transmitting optical signals from an optical signal transmitter to the optical system.

12. The forward looking turret of claim 11 further comprising a bearing interface associated with each yoke arm that rotatably connects the sphere to each opposing yoke arm, wherein the drive mechanism comprises dual opposing drive assemblies that contact the sphere and rotate the sphere about the first axis, the dual opposing drive assemblies work against one another to prevent backlash, rotation of the sphere in one direction or in an opposite direction is caused by generating a different torque in each dual opposing drive assembly so that the torque in one dual opposing drive assembly overcomes the torque in the other dual opposing drive assembly to rotate the sphere.

13. The forward looking turret of claim 12, further comprising:

an encoder scale provided on the sphere; and an encoder reader mounted on the bulkhead to read the encoder scale and detect a position of the aperture about the first axis.

14. The forward looking turret of claim 12, wherein the optical path comprises a coudé optical path for transmitting optical signals from an optical signal transmitter to the optical system.

15. The forward looking turret of claim 14, further comprising a roller bearing on each side of the disk to rotatably couple the disk to an interior bulkhead of the sphere, wherein each roller bearing comprises a toroid shape with an opening for the coudé optical path.

16. The forward looking turret of claim 15, further comprising an electrical drive motor associated with at least one of the roller bearings for rotating the disk about the second axis.

17. A method for providing a forward looking turret, comprising:

providing a pod including a pair of opposing yoke arms extending from the pod, the pair of opposing yoke arms defining a first axis;

rotatably mounting a sphere between the opposing yoke arms for rotation about the first axis, the sphere extending partially from an open circular end of the pod, the sphere and open circular end of the pod being configured to substantially prevent drag and allow rotation of the sphere within the pod;

providing a bulkhead disposed behind the sphere within the pod;

providing a drive mechanism mounted to the bulkhead, the drive mechanism being configured to rotate the sphere about the first axis;

rotatably mounting a disk within the sphere for rotation about a second axis perpendicular to the first axis, the disk including a diameter slightly smaller than the sphere that permits rotation of the disk within the sphere, wherein the second axis is offset from the first axis;

providing an aperture in the disk, wherein the sphere comprises a slot within which the aperture is moveable between a position proximate each of the pair of opposing yoke arms in response to rotation of the disk about the second axis, the aperture being movable to define a field of coverage in response to rotation of the sphere about the first axis and the disk about the second axis;

housing at least a portion of an optical system within the disk, wherein the optical system is configured for transmitting and receiving optical signals via the aperture; and providing an optical path that transmits optical signals from an optical signal transmitter to the optical system.

18. The method of claim 17, further comprising:

rotatably connecting the sphere to each opposing yoke arm by a bearing interface; and wherein providing the drive mechanism comprises providing dual opposing drives that contact the sphere and rotate the sphere about the first axis, preventing backlash by the dual opposing drives work against one another, the sphere being rotated in one direction or in an opposite direction by generating a different torque in each drive so that the torque in one drive overcomes the torque in the other drive to rotate the sphere.

19. The method of claim 17, wherein providing the optical path comprises providing a coudé optical path that transmits optical signals from an optical signal transmitter to the optical system.

20. The method of claim 17, further comprising mounting the forward looking turret to an aircraft.

* * * * *

UNITED STATES PATENT AND TRADEMARK OFFICE
CERTIFICATE OF CORRECTION

| | | |
|---|---|---|
| PATENT NO. | : 9,718,561 B2 | Page 1 of 1 |
| APPLICATION NO. | : 14/502358 | |
| DATED | : August 1, 2017 | |
| INVENTOR(S) | : John P. Blackburn et al. | |

It is certified that error appears in the above-identified patent and that said Letters Patent is hereby corrected as shown below:

In the Claims

In Column 10, Line 52, please change to:
"comprises a truncated sphere with a semispherical portion"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*